(12) United States Patent
Kutliroff

(10) Patent No.: US 10,719,759 B2
(45) Date of Patent: *Jul. 21, 2020

(54) SYSTEM FOR BUILDING A MAP AND SUBSEQUENT LOCALIZATION

(71) Applicant: INTEL CORPORATION, Santa Clara, CA (US)

(72) Inventor: Gershom Kutliroff, Alon Shvut (IL)

(73) Assignee: Intel Corporation, Santa Clara, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/110,212

(22) Filed: Aug. 23, 2018

(65) Prior Publication Data

US 2019/0057299 A1 Feb. 21, 2019

Related U.S. Application Data

(63) Continuation of application No. 14/752,093, filed on Jun. 26, 2015, now Pat. No. 10,062,010.

(51) Int. Cl.
*G06N 3/04* (2006.01)
*G05D 1/02* (2020.01)
(Continued)

(52) U.S. Cl.
CPC .............. *G06N 3/04* (2013.01); *G05D 1/0246* (2013.01); *G06K 9/00664* (2013.01);
(Continued)

(58) Field of Classification Search
CPC .......... G06N 3/04; G06N 3/0454; G06N 3/08; G06N 3/084; G06T 7/73;
(Continued)

(56) References Cited

U.S. PATENT DOCUMENTS 5,790,690 A * 8/1998 Doi ....................... G06T 7/0012
382/128
7,467,115 B2 12/2008 Edelman et al.
(Continued)

OTHER PUBLICATIONS

Karlsson, Niklas et al., "The vSLAM Algorithm for Robust Localization and Mapping", Robotics and Automation, 2005, ICRA 2005. Proceedings of the 2005 IEEE International Conference on. IEEE, 2005, 6 pages, 2005.
(Continued)

*Primary Examiner* — Manav Seth
(74) *Attorney, Agent, or Firm* — Finch & Maloney PLLC

(57) ABSTRACT

SLAM systems are provided that utilize an artificial neural network to both map environments and locate positions within the environments. In some example embodiments, a sensor arrangement is used to map an environment. The sensor arrangement acquires sensor data from the various sensors and associates the sensor data, or data derived from the sensor data, with spatial regions in the environment. The sensor data may include image data and inertial measurement data that effectively describes the visual appearance of a spatial region at a particular location and orientation. This diverse sensor data may be fused into camera poses. The map of the environment includes camera poses organized by spatial region within the environment. Further, in these examples, an artificial neural network is adapted to the features of the environment by a transfer learning process using image data associated with camera poses.

21 Claims, 9 Drawing Sheets

(51) Int. Cl.
G06T 7/73 (2017.01)
G06K 9/62 (2006.01)
G06K 9/00 (2006.01)
G06N 3/08 (2006.01)

(52) U.S. Cl.
CPC ......... *G06K 9/6262* (2013.01); *G06K 9/6272* (2013.01); *G06N 3/0454* (2013.01); *G06N 3/08* (2013.01); *G06N 3/084* (2013.01); *G06T 7/73* (2017.01); *G06K 9/6223* (2013.01); *G06T 2207/20081* (2013.01); *G06T 2207/20084* (2013.01); *G06T 2207/30244* (2013.01)

(58) Field of Classification Search
CPC . G06T 2207/20081; G06T 2207/20084; G06T 2207/30244; G05D 1/0246; G06K 9/00664; G06K 9/6262; G06K 9/6272; G06K 9/6223
See application file for complete search history.

(56) References Cited

U.S. PATENT DOCUMENTS

| | | | | |
|---|---|---|---|---|
| 7,545,965 | B2 * | 6/2009 | Suzuki | G06T 5/007 382/128 |
| 7,868,772 | B2 * | 1/2011 | Chao | G08B 17/125 340/573.6 |
| 9,008,440 | B2 * | 4/2015 | Kim | G06K 9/00 382/199 |
| 10,062,010 | B2 * | 8/2018 | Kutliroff | G06K 9/6272 |
| 2009/0295791 | A1 | 12/2009 | Aguera Y Arcas et al. | |
| 2011/0050897 | A1 | 3/2011 | Cobb et al. | |
| 2012/0197439 | A1 | 8/2012 | Wang et al. | |
| 2012/0230550 | A1 | 9/2012 | Kraut | |
| 2016/0379092 | A1 * | 12/2016 | Kutliroff | G06N 3/04 382/158 |

OTHER PUBLICATIONS

Saeedi, Sajad et al., "Neural Network-Based Multiple Robot Simultaneous Localization and Mapping", IEEE Transactions on Neural Networks Dec. 22, 2011, 2376-2387, 14 pages.

Karpathy, Andrej, "CS231n Convolutional Neural Networks for Visual Recognition", http://cs231n.github.io/transfer-learning/ stanford university, Feb. 13, 2015, retrived online on Oct. 3, 2017, 7 pages.

Sünderhauf, Niko et al., "On the Performance of ConvNet Features for Place Recognition", arXiv Preprint arXiv:1501.04158, 2015, 8 pages.

Jia, Yangqing et al., "Caffe: Convolutional Architecture for Fast Feature Embedding", Proceedings of the 22nd ACM International Conference on Multimedia, ACM, 2014, 4 pages.

Dymczyk, Marcin et al., "The Gist of Maps-Summarizing Experience for Lifelong Localization", Robotics and Automation (ICRA), 2015 IEEE International Conference on IEEE, 2015, 7 pages.

Milford, Michael J. et al., "SeqSLAM: Visual Route-Based Navigation for Sunny Summer Days and Stormy Winter Nights", Robotics and Automation (ICRA), 2012 IEEE International Conference on IEEE, 2012, 10 pages.

Alex Krizhevsky et al., "ImageNet Classification with Deep Convolutional Neural Networks", NIPS, 2012, 9 pages.

* cited by examiner

SYSTEM FOR BUILDING A MAP AND SUBSEQUENT LOCALIZATION

RELATED APPLICATIONS

This patent application is a continuation of U.S. patent application Ser. No. 14/752,093, filed Jun. 26, 2015, titled "System for Building a Map and Subsequent Localization," which is hereby incorporated herein by reference in its entirety.

BACKGROUND

Conventional approaches to navigating a previously unrecorded space require concurrently solving two related problems: understanding the layout of the space in order to create a map, and, at the same time, locating one's own position on the map. In the fields of robotics and computer vision, this is known as the Simultaneous Localization and Mapping (SLAM) problem. The relevance of this problem to the field of robotics and autonomous systems is self-evident. However, it is also a critical functionality for many other applications in the field of computer vision, especially in the areas of 3D reconstruction and scene understanding. Visual SLAM (VSLAM) solutions rely on input from image sensors, possibly in addition to other sensors, and have certain advantages over other input devices, such as the ability to calculate one's absolute (as opposed to relative) location in the world and support for a high level of precision.

DETAILED DESCRIPTION

Figure 1:
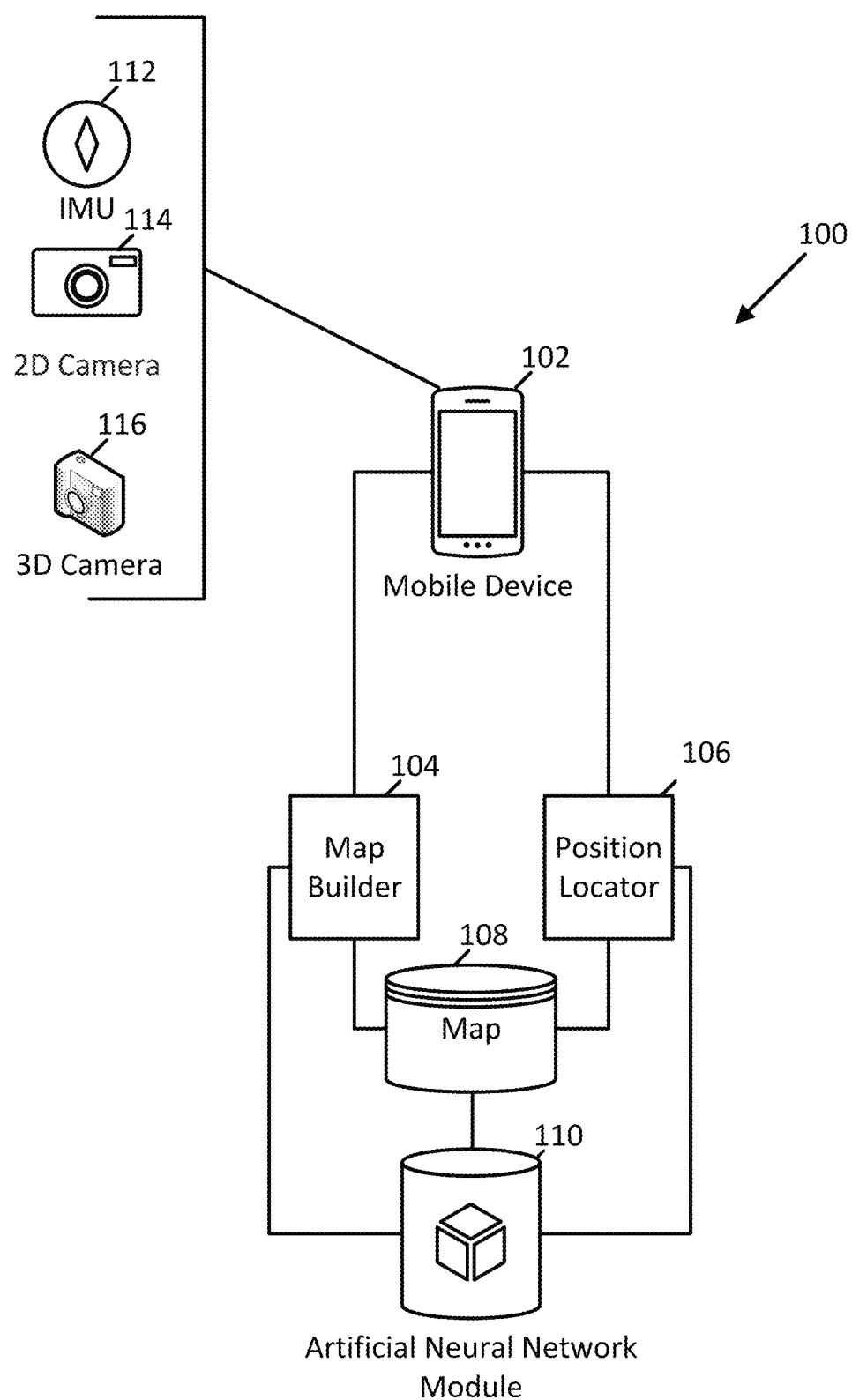
FIG. 1 illustrates a SLAM system configured in accordance with an embodiment of the present disclosure.

SLAM systems disclosed herein utilize an artificial neural network to both map environments and locate positions within the environments. In some example embodiments, a sensor arrangement is used to map an environment. This sensor arrangement may be included in, for example, a smartphone including a depth ("3D") camera and a red, green, and blue ("RGB" or "2D") camera, a gyroscope, and an accelerometer. The sensor arrangement acquires sensor data from the various sensors and associates the sensor data, or data derived from the sensor data, either with spatial regions in the environment or with movements of the sensor arrangement. The sensor data may include image data (from camera) and inertial measurement data (from gyroscope/accelerometer or some other inertial measurement unit). This diverse sensor data effectively describes the visual appearance of a spatial region at a particular location and orientation. Some example embodiments fuse the diverse sensor data to calculate one or more camera poses. Each of these one or more camera poses houses data that defines a location of the sensor arrangement at which sensor data was acquired. In some examples, each camera pose specifies translations (x, y, z) and rotations (yaw, pitch, roll) that the sensor arrangement has undergone since the previous camera pose. The 3D locations of the camera at successive points in time, as defined by the camera poses, can be paired with accumulated sensor data to construct a map representation of the environment. In these examples, the map of the environment includes sensor data associated with camera poses and organized by spatial region within the environment. Further, in these examples, an artificial neural network is adapted to the features of the environment by a transfer learning process trained on image data associated with the camera poses. Subsequently, localization processes provide image data to the artificial neural network. The artificial neural network processes the image data and outputs information identifying a spatial region on the map described by the image data. Some examples provide more precise localization by searching keypoints within keyframes associated with camera poses in the identified spatial region to determine the location and orientation of the sensor arrangement that acquired the sensor data.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements.

General Overview

As previously explained, conventional approaches to navigating a recorded space provide a number of benefits, but also suffer from disadvantages as well, depending on the implementation. For example, consider GPS-based navigation solutions. While very effective for some tasks, GPS-based systems tend to be limited by their inability to track in indoor environments, as well as their precision, which is generally in the range of a few meters for consumer-level equipment. While computer vision-based alternatives compensate for this lack of precision, they are subject to other factors that limit their utility, such as "camera drift", which is a tendency for camera pose tracking errors to propagate until the solution can no longer resolve the camera location.

Thus, and in accordance with some examples of the present disclosure, a SLAM system is provided that can quickly re-localize its position and orientation after a disorienting event. This SLAM system uses the data streams captured by low-cost sensors available on a consumer device. In a one example, the device is a tablet, and the sensors are an RGB camera, a depth camera, and the IMU sensors (such as a gyroscope and an accelerometer). The SLAM system uses the device to map an environment. The coordinate system underlying the map is based on camera poses. These camera poses may be derived from two-dimensional image data from an RBG camera, three-dimensional image data from a depth camera, and inertial measurement data.

In some examples, the SLAM system organizes the sensor data into collections. These collections, in turn, are associated with features of the environment, such as spatial regions. In some examples, this organization is accomplished by associating keyframes with keyframe groups and associating the keyframe groups with spatial regions.

Once the map of the environment has been created, in some examples, the SLAM system executes a transfer learning process in which the final, classification layer of a pre-existing artificial neural network is replaced with a new classification layer. This new classification layer is trained using the map data described herein. In at least one example, the artificial neural network is a deep convolutional artificial neural network.

After the artificial neural network has been retrained, a user can quickly locate himself on the map, without needing to track his movements starting from the beginning of the map. For example, the user may use his device to capture a single image of his surroundings and feed the image into the new artificial neural network to quickly determine his location on the map. This re-localization process is accomplished by interpreting the output of the new classification layer of the artificial neural network to identify into which class the image has been classified with the highest level of confidence. This same technique can also be used to recover the device's position during the initial construction of the map, in the case where tracking is lost.

In some examples, the user can also locate his position and orientation using keyframes and camera poses. For instance, in some examples, the SLAM system searches keyframes associated with a spatial region to identify a keyframe that most closely resembles image data acquired by a sensor controlled by the user. The camera pose associated with the identified keyframe reveals the location and orientation of the sensor that acquired the image data. It should be noted that only the keyframes associated with a particular spatial region are searched. By first applying the artificial neural network to find the local region of the map corresponding to the capture images, and only successively searching the keyframes associated with the camera poses for a finer resolution of the location, this technique conserves computing resources, especially in view of the fact that the volume of camera poses calculated in even moderately sized environments can be large.

SLAM System

FIG. 1 illustrates a SLAM system 100 in accordance with an example embodiment. As shown in FIG. 1, the SLAM system 100 includes a programmable mobile device 102, a map building module 104, a position locating module 106, map data store 108, and an artificial neural network module 110. In various examples, the mobile device 102 includes a variety of sensors. The programmable device 102 may be implemented using a programmable device, such as may be fabricated using any of the components of the systems described below with reference to FIGS. 9 and 10. As shown in FIG. 1, the mobile device 102 includes at least one of an IMU 112, a 2D camera 114 (e.g., an RBG camera, a black-and-white camera, an infrared camera, etc.), and a 3D camera 116 (e.g., a depth camera). In other examples, the sensors may include global positioning system sensors, magnetometers, and the like. In some examples, the mobile device 102 further includes a network interface with circuitry (e.g., a wired or wireless transceiver, connector, antenna, etc.) and a software stack that collectively enable the mobile device 102 to communicate with other devices via a communication network. For instance, one example in accord with FIG. 1, the mobile device 102 transmits sensor data to the map building module 104 and the position locating module 106.

As shown in FIG. 1, the map building module 104 is configured to process sensor data to build a map and communicate with the artificial neural network module 110 to adapt the artificial neural network for use by the position locating module 106. When executing according to this configuration, the map building module 104 receives sensor data from the mobile device 102. The map building module 104 uses the received sensor data to generate map data and stores the map data in the map data store 108. Periodically, or in response to an update message indicating that the map data has been updated to a sufficient extent, the map building module 104 transmits a retrain message to the artificial neural network module 110. What constitutes a sufficient extent may be defined by the value of a configurable parameter. In one example, the update message includes a request for the artificial neural network module 110 update the artificial neural network with the updated map data. Additional example processes that the map building module 104 is configured to execute are described further below with reference to FIGS. 2-5 and 8.

As depicted in FIG. 1, the map data store 108 includes map data. This map data may include camera poses, sensor data associated with the camera poses, and associations between the sensor data and one or more spatial regions within an environment. As described further below, in some examples, the camera poses are based on (e.g., calculated from) sensor data received from the mobile device 102. This sensor data may include two-dimensional image data, three-dimensional image data, inertial measurement data, and the like. Further, in at least one example, the values stored in the image data are feature descriptors (e.g., SIFT, SURF, ORB) calculated based on unprocessed images included in the sensor data. A graph representation of map data is described further below with reference to FIGS. 3 and 4.

The associations between sensor data and spatial regions may include any of a wide variety of data elements configurable for associative purposes. A few examples include pointers, arrays, linked lists, tuples, relational tables, and the like. Many other data elements and structures may be implemented to establish and track associations within a programmable device. A graph representation of the associations is described further below with reference to FIGS. 3 and 5.

As shown in FIG. 1, the position locating module 106 is configured to process sensor data to locate a spatial region in which the sensor transmitting the data is positioned and, optionally, identify the position and orientation of the sensor within the spatial region. When executing according to this configuration, the position locating module 106 receives sensor data from the mobile device 102. The position locating module 106 transmits image data included in the received sensor data to the artificial neural network module 110 in a classify message. The classify message includes information requesting that the artificial neural network module 110 transmit a region message in reply that includes a region identifier of the spatial region in which the sensor is positioned. In response to receiving the region message, the position locating module 106 parses the region message to access the identifier for subsequent processing. In some examples, the position locating module 106 uses the region identifier to access a collection of keyframes stored in the map data and searches the collection to find a keyframe that matches the sensor data. Next, the position locating module 106 identifies a camera pose associated with the matching keyframe thereby identifying the position and orientation of the sensor in the identified spatial region. Additional example processes that the position locating module 106 is configured to execute are described further below with reference to FIGS. 2, 7, and 8.

As shown in FIG. 1, the artificial neural network module 110 is configured to implement, maintain, and utilize an artificial neural network. This artificial neural network may be a "deep" convolutional artificial neural network. Such neural networks are comprised of a sequence of individual layers, with each successive layer operating on data generated by a previous layer.

More specifically, in some examples, each layer of the deep convolutional artificial neural network comprises four operations. First, the artificial neural network module executes a series of convolutions of the image data with multiple weight maps. The number of images generated by the series of convolutions is determined by the number of weight maps with which the image data is convolved. Subsequently, the artificial neural network module applies a nonlinear function to the image data generated by the series of convolutions. This nonlinear function may be a rectified linear unit function (ReLU) or the hyperbolic tangent function (tanh). In some examples, the artificial neural network module also applies a local contrast normalization function to improve the invariance to contrast. Next, the artificial neural network module implements a pooling layer that processes the image data after application of the nonlinear function and local contrast normalization function. The pooling layer generates the same number of images but the spatial resolution of each image is reduced, typically by a factor of 4. In this way, the pooling layer generates subsampled images of the images described in the original image data.

This sequence of operations—convolutions, nonlinearity, contrast normalization, and pooling—represents a single layer of a deep convolutional artificial neural network. The weight maps applied through the series of convolutions in each layer represent features implicit in the data used to train the neural network. These features are learned from the training data, e.g., through a learning process such as backpropagation.

In some examples, the artificial neural network module 110 implements a deep convolution artificial neural network configured to classify images depicted within image data into classes corresponding to spatial regions of the environment. In these examples, the final layer of the artificial neural network is a classification layer that processes data from a preceding layer and maps the data to the specific classes corresponding to the spatial regions. An advantage of this technique is that artificial neural networks are robust classifiers even when processing images with changes in ambient lighting or views that were not present in the training data.

Because the weight maps characterize features of the training data, the content of the training data is important and should be generally similar to the data to be classified. In one example, the training data consists of many images of typical indoor scenes, including scenes of homes, offices, shops, etc., in which objects appearing within the images are marked with one of 1,000 different class names. Typical classes within the training data are "couch," "picture," "book," and "television."

In some examples, the artificial neural network module 110 is configured to train a deep convolutional artificial neural network by executing a backpropagation process based on the training data. In this way, the artificial neural network module executes a search for weight map parameters that best classify all of the training data into the 1,000 classes.

Another important factor in the performance of a deep convolutional artificial neural network is the specific design of the network's architecture. The design of the network's architecture may specify a number of parameters including a number of layers, a number of weight maps per layer, values of the weight maps, whether contrast normalization is done, the type of pooling performed, etc. In at least one example, the artificial neural network module 110 implements a standard neural network architecture, such as the architecture described by Krizhevsky, A., Sustkever, I., and Hinton, G. E. in "ImageNet Classification with Deep Convolutional Neural Networks," NIPS, 2012, although any number of other neural network architectures can be used, as will be appreciated in light of this disclosure.

In some examples, the artificial neural network module 110 is configured to receive and respond to various messages. When executing according to this configuration the artificial neural network module 110 receives and processes retrain messages. In these examples, the artificial neural network module 110 is configured to parse and respond to retrain messages by training a classification layer of the artificial neural network using the map data. This training process may executed a part of a transfer learning process, such as the transfer learning processes described further below with reference to FIGS. 2 and 6.

In other examples, the artificial neural network module 110 is configured to process classify messages. When executing according to this configuration, the artificial neural network module 110 receives classify messages. In response to receiving a classify message, the artificial neural network module 110 parses the classify message to access the image data specified by the classify message. Next, the artificial neural network module 110 processes the image data via the artificial neural network and generates information identifying a spatial region depicted in the image data. This identification information may include, for example, a set of class identifiers and a confidence metrics, wherein each member of the set includes a value identifying a class (e.g., a spatial region) and a value indicating a level of confidence that the image data belongs to the class. Lastly, the artificial neural network module 100 transmits a region message to the position locating module 106. The region message may include a region identifier (i.e., the class with the highest confidence metric, provided that the value of that confidence metric exceeds a value specified by a configurable parameter). The region identifier may be null where the highest confidence metric does not exceed the value specified by the configurable parameter.

Figure 2:
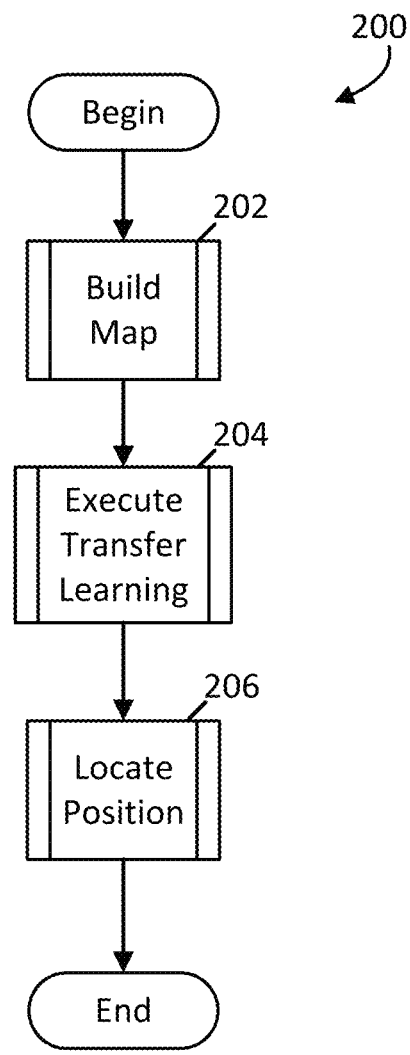
FIG. 2 illustrates a SLAM process configured in accordance with an embodiment of the present disclosure.

According to some examples, a SLAM system (e.g., the SLAM system 100 of FIG. 1) executes processes that map an environment and locate a position of a sensor in the environment. FIG. 2 illustrates a SLAM process 200 in accord with these examples. As shown in FIG. 2, the SLAM process 200 includes several acts that, in combination, enable a SLAM system to build a map, use the map to train a classification layer of an artificial neural network, and use the adapted artificial neural network to locate a position of a sensor based on image data provided by the sensor.

In act 202, the SLAM system builds a map of an environment by executing a map building module (e.g., the map building module 104). The map building module, in turn, executes a map building process, such as the map building process 300 described below with reference to FIG. 3.

In act 204, the SLAM system adapts an existing artificial neural network to the map of the environment by executing an artificial neural network module (e.g., the artificial neural network module 110). The artificial neural network module, in turn, executes a transfer learning process, such as the transfer learning process 600 describe below with reference to FIG. 6. Transfer learning is a method whereby the final layer of the artificial neural network—the "classification layer" can be re-configured in order to classify images into a new set of classes, distinct from the original set of classes upon which the entire network was originally trained. Importantly, re-training the entire network—that is, adjusting the values of the weight maps—is not necessary in order to re-configure the final layer. With transfer learning, the final "classification layer" is discarded and the output of the neural network becomes the high-level features generated by the layer immediately preceding the classification layer. These high-level features are a sparse representation of the image data provided to the neural network for classification, and a classification layer is re-configured, based on the new training data set and its associated labels.

In act 206, the SLAM system locates a position of a sensor in the environment by executing a position locating module (e.g., the position locating module 106) and an artificial neural network module (e.g., the artificial neural network module 110). The position locating module and the artificial neural network module, in turn, locate the position of the sensor by executing a position locating process, such as the position locating process 700 described below with reference to FIG. 7.

Processes in accord with the SLAM process 200 enable common, low cost sensors to be used to map an environment and locate a position within the environment in a robust manner.

Figure 3:
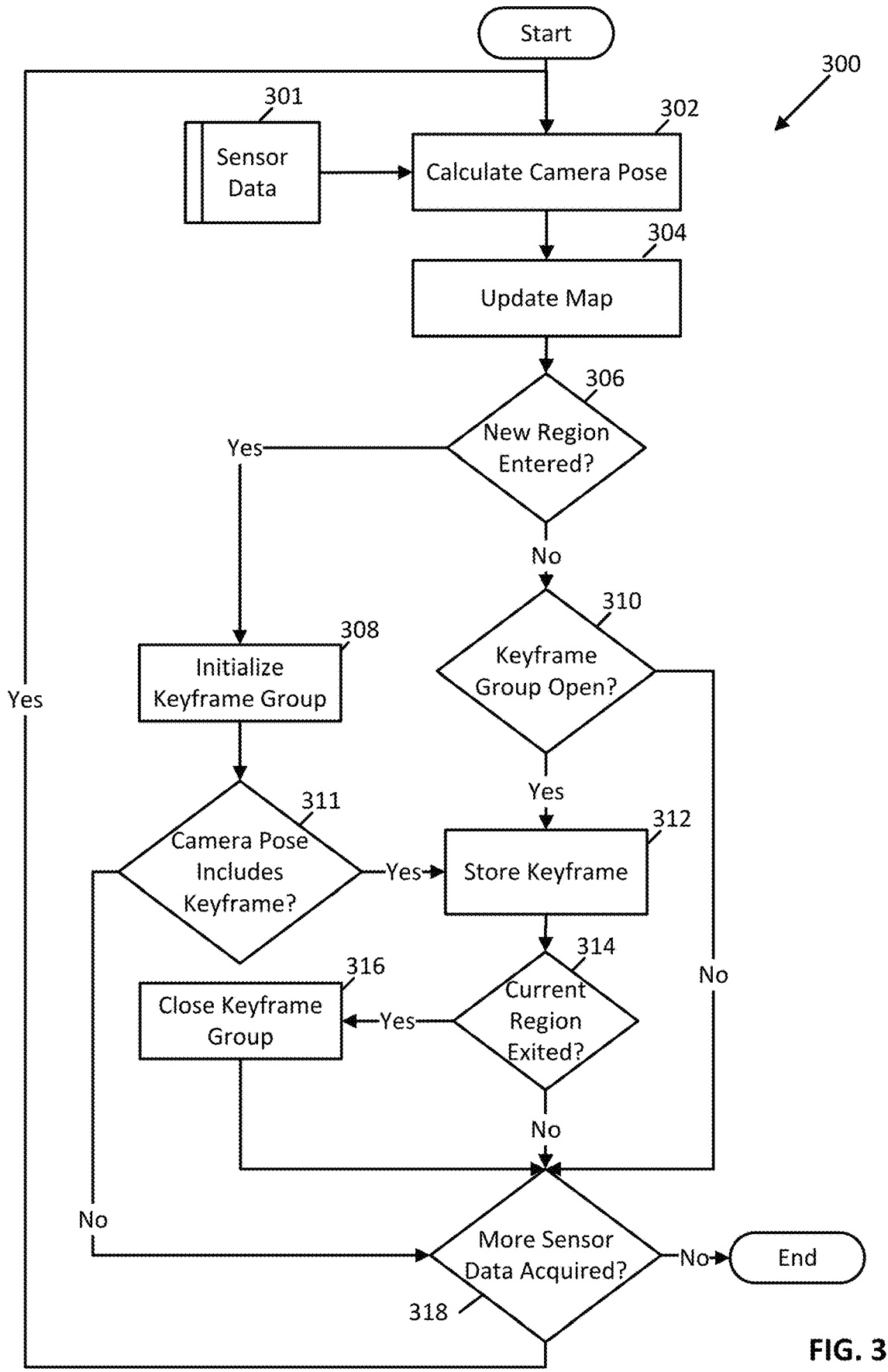
FIG. 3 illustrates a mapping process configured in accordance with an embodiment of the present disclosure.

As described above with reference to FIG. 2, some examples implement processes that build a map of an environment. FIG. 3 illustrates one such process, a map building process 300. As shown in FIG. 3, the map building process 300 includes several acts that, in combination, enable a SLAM system to build a map of an environment. In some examples, the map building process 300 is repeatedly executed to process 60 or more camera poses per second.

In act 302, the map building module receives sensor data 301 and calculates a camera pose. The camera pose may be computed by fusing sensor data from multiple sources (e.g., via a Kalman filter). The input channels of the sensor data are largely orthogonal to one another in that they rely on independent sensors. By fusing the sensor data together to yield the camera poses, the map building module creates data that is accurate and robust for tracking of the position and orientation of a sensor.

Figure 4:
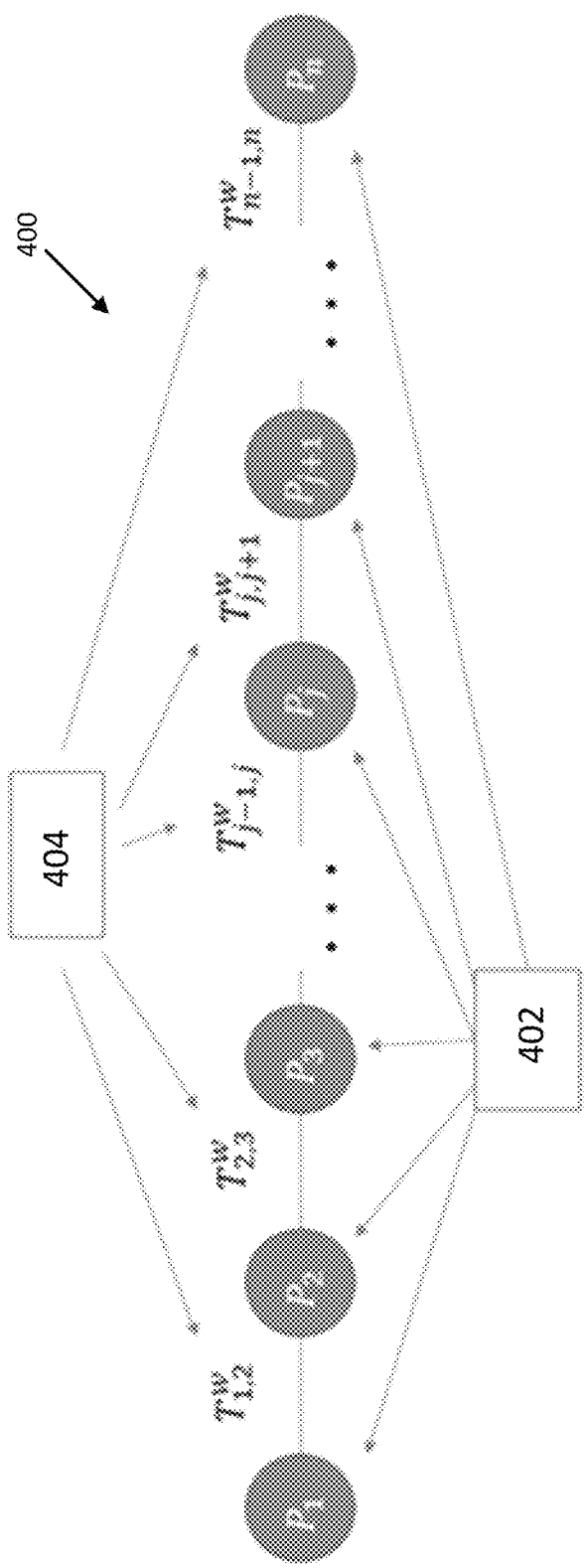
FIG. 4 illustrates a map data structure configured in accordance with an embodiment of the present disclosure.

In act 304, the map building module updates the map (i.e., the map data) with the newly calculated camera pose. The act 304 will now be further described with added reference to FIG. 4. As illustrated in FIG. 4, a map 400 includes map element nodes 402 and links 404. In some examples, each node 402 includes a camera pose. Each of the links 404 couples two of the nodes 402 to one another.

In some examples, each successive node 402 represents a new position in an environment coordinate system. As illustrated in FIG. 4, this environment coordinate system includes nodes $P_1$ though $P_n$. Thus, in these examples, the node $P_j$ corresponds to the $j^{th}$ position within the environment. Where each node 402 includes a camera pose, j is an index useful for addressing the $j^{th}$ camera pose.

From the perspective of a node 402, a link may couple the node to a preceding node or a succeeding node. Thus, the transformation $T^w_{j,j+1}$ describes the movement (translation+ rotation) from world position $P_j$ to $P_{j+1}$. Similarly, the inverse transformation $T^w_{j,j+1}{}^{-1}$ maps the world position $P_{j+1}$ to $P_j$. Thus, within the act 304, the map building module updates the map by appending a new node (e.g., $P_{n+1}$, not shown) to the last node in the map, node $P_n$.

In the act 306, the map building module determines whether a sensor has entered a new spatial region of the environment. In some examples, the map building module determines that the sensor has entered a new spatial region where the map building module receives a message indicating that a new region has been entered. In one example, the map building module receives this message from a user interface of the mobile device (e.g., the mobile device 102). In another example, the map building module receives this message from a system interface of the mobile device (e.g., from a module that tracks the position of the mobile device using a global positioning system chip-set). If the map building module determines that a new region was entered, the map building module executes the act 308. Otherwise, the map building module executes the act 310.

In the act 308, the map building module initializes and opens a keyframe group. A keyframe group is a collection that is used to associate keyframes with spatial regions of the environment. In some examples, the map building module maintains a 1-to-1 correspondence between keyframe groups and spatial regions.

In some examples, a keyframe is a frame of image data that is automatically targeted for subsequent processing due its content or timing (e.g., expiration of a time interval specified by a configurable parameter). A keyframe targeted due to content may include image data that depicts one or more keypoints. A keypoint is a point of interest within a frame that can be used to distinguish identity and location of objects depicted by image data within the frame.

Figure 5:
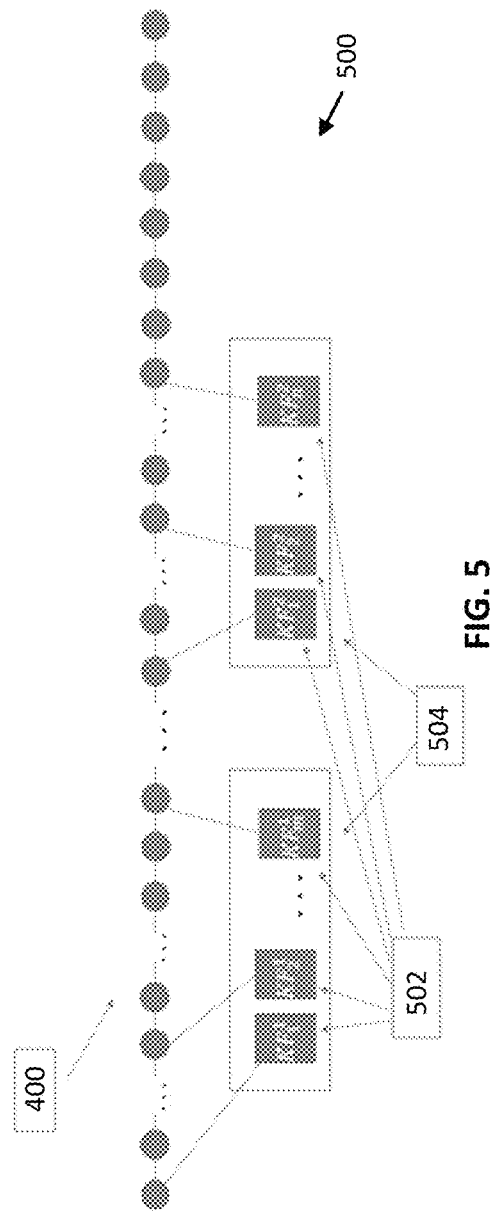
FIG. 5 illustrates another map data structure configured in accordance with an embodiment of the present disclosure.

FIG. 5 illustrates keyframe groups and their relationship with the map. As illustrated in FIG. 5, a keyframe groups and map arrangement 500 includes the map 400 and keyframe groups 504. The keyframe groups 504 include keyframes 502. In some examples, the existence of each keyframe group 504 creates an association between the keyframes 502 included in the keyframe group 504 and a spatial region of the environment. In addition, in some examples, each keyframe group 504 creates an association between the spatial region and the map element node 402 linked to the keyframe 502 included in the keyframe group 504.

Returning now to the map building process 300 illustrated in FIG. 3, in act 310, the map building module determines whether an open keyframe group exists. If so, the map building module executes the act 312. Otherwise, the map building module determines whether more sensor data has been acquired in act 318. If so, the map building module executes the act 302. Otherwise, the map building module terminates the map building process 300.

In the act 311, the map building module determines whether the camera pose is associated with a keyframe. If so, the map building module executes the act 312. Otherwise, the map building module executes the act 318.

In some examples, the map building module determines whether the camera pose is associated with a keyframe by analyzing image data associated with the camera pose to determine whether the image data includes any keypoints. If so, the map building module records the image data as a keyframe. Otherwise, the map building module determines that the camera pose is not associated with a keyframe.

In other examples, the map building module determines whether the camera pose is associated with a keyframe by referring to an interval timer. In these examples, where the interval timer has expired, the map building module determines that the camera pose is associated with a keyframe and resets the interval timer to a value defined by a configurable parameter. Where the interval timer has not expired, the map building module determines that the camera pose is not associated with a keyframe.

Other examples may use a combination of the techniques described above, or other techniques, to determine whether the camera pose is associated with a keyframe. Thus the examples disclosed herein are not limited to a particular technique of identifying keyframes.

In the act 312, the map building module stores the keyframe in association with the open keyframe group. In some examples, the map building module executes the act 312 by creating a reference to the camera pose node within the open keyframe group. In other examples, the map building module executes the act 312 by creating a reference between a keyframe stored in the open keyframe group and the camera pose node.

In the act 314, the map building module determines whether the current spatial region has been exited. In some examples, the map building module determines that the sensor has exited the current spatial region where the map building module receives a message indicating that the current spatial region has been exited. In one example, the map building module receives this message from a user interface of the mobile device. In another example, the map building module receives this message from a system interface of the mobile device (e.g., from a module that tracks the position of the mobile device using a global positioning system chip-set). If the map building module determines that the current spatial region was exited, the map building module executes the act 316. Otherwise, the map building module executes the act 318.

In the act 316, the map building module closes the currently open keyframe group.

Processes in accord with the map building process 300 enable common, low cost sensors to be used to map an environment using camera poses, keyframes, and keyframe groups.

Figure 6:
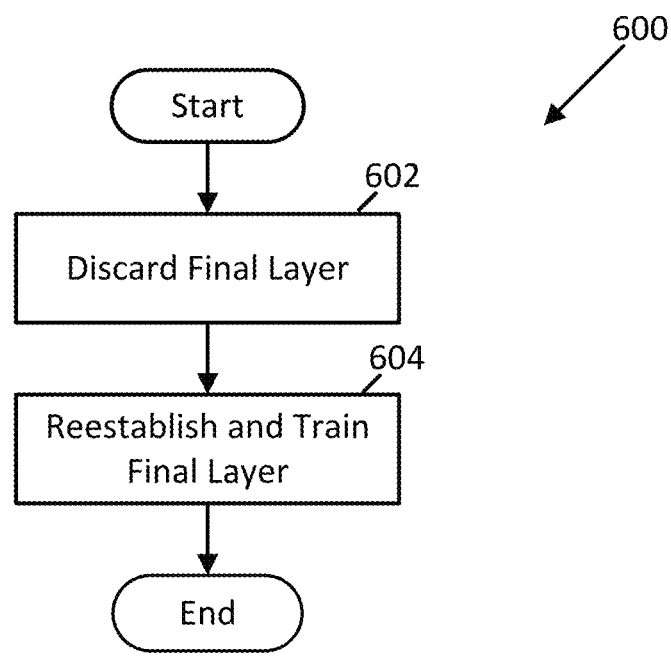
FIG. 6 illustrates a transfer learning process configured in accordance with an embodiment of the present disclosure.

As described above with reference to FIG. 2, some examples implement processes that adapt an existing artificial neural network to the map of the environment. FIG. 6 illustrates one such process, a transfer learning process 600. As shown in FIG. 6, the transfer learning process 600 includes acts that, in combination, enable a SLAM system to generate an artificial neural network trained to classify sensor data including images of spatial regions.

In act 602, the artificial neural network module discards the final layer of an existing artificial neural network. In some examples, the existing artificial neural network is a deep convolutional artificial neural network. In these examples, the final layer is a classification layer trained on data other than the current map data.

In act 604, the artificial neural network module re-establishes and trains a new final layer using the current map data. In some examples, this training process is based on output from the penultimate layer of the artificial neural network and labeled map data (e.g., image data labeled with the spatial region associated with the camera pose). The result of this training process is a new classification layer. This classification layer, in turn, produces a set of information identifying a spatial region depicted in image data provided as input to the artificial neural network module. In one example, the classification technique implemented by the new classification layer is a k-nearest-neighbors scheme, where k=5. However, other classification techniques may be used as well, such as support vector machines and random forests.

Processes in accord with the transfer learning process 600 enable classification systems to repurpose existing artificial neural networks without incurring the computing resources required to completely retrain all layers of the artificial neural networks.

Figure 7:
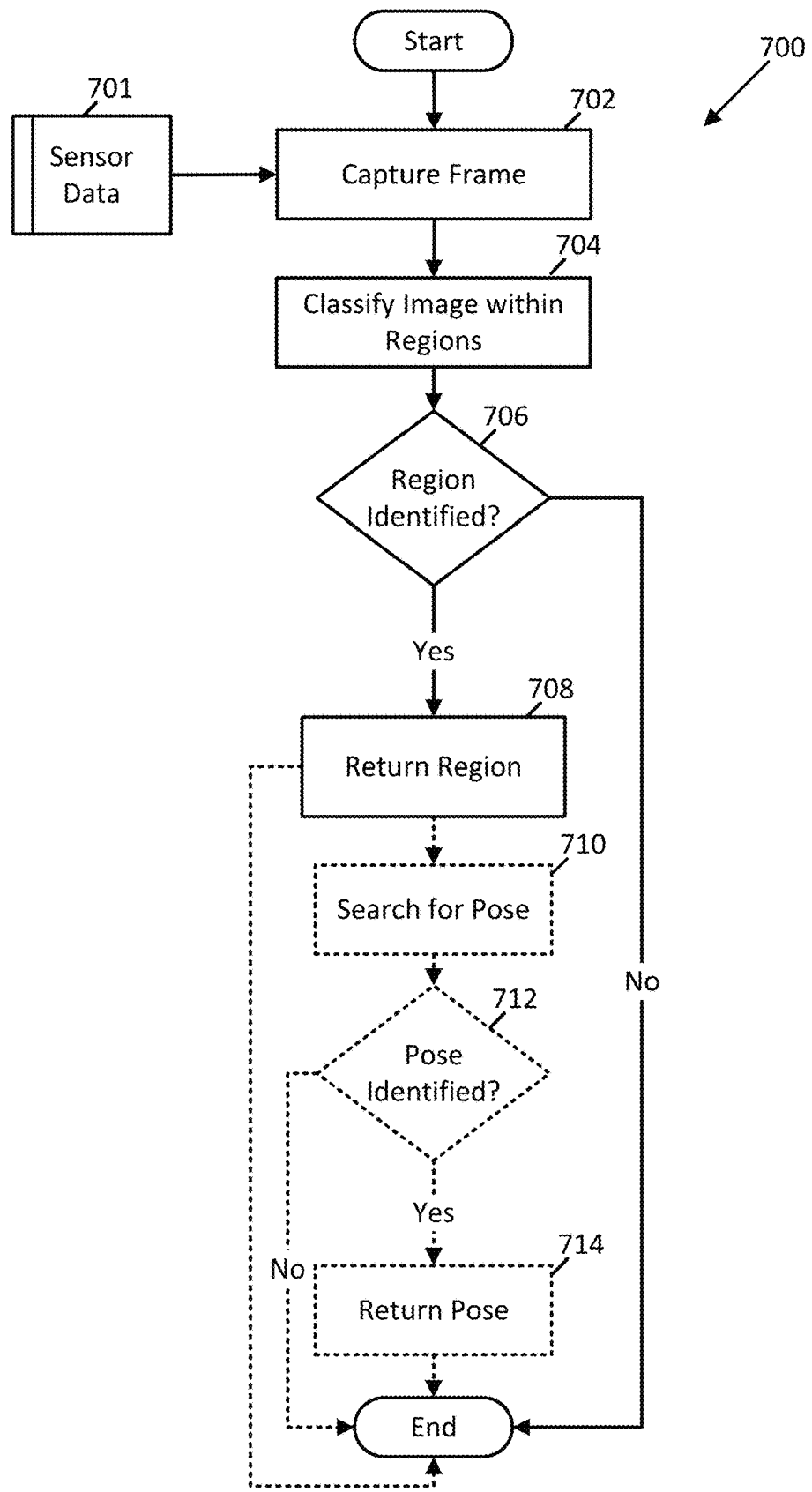
FIG. 7 illustrates a position locating process configured in accordance with an embodiment of the present disclosure.

As described above with reference to FIG. 2, some examples implement processes that locate a position of a sensor in an environment. FIG. 7 illustrates one such process, a position locating process 700. As shown in FIG. 7, the position locating process 700 includes several acts that, in combination, enable a SLAM system to locate a position, and optionally an orientation, of a sensor in an environment. In FIG. 7, acts and flows that are optional in some examples are denoted with dashed lines.

In act 702, the position locating module receives sensor data 701 and captures a frame including image data depicting an image. In act 704, the position locating module transmits a classify message the artificial neural network. The classify message includes a request to classify the image data included in the capture frame within the spatial regions included in the environment.

In act 704, the artificial neural network module responds to receipt of the classify message by parsing the message and processing the image data via the artificial neural network. In doing so, the artificial neural network module attempts to classify the image data as being a member of one of the spatial regions. Next, the artificial neural network module responds to the classify message by transmitting a region message to the position locating module. The region message may specify identification information output by the artificial neural network.

In act 706, the position locating module determines whether the image data depicts a portion of a particular spatial region. In one example, the position locating module compares the identification information specified in the region message to a threshold value. This threshold value may be specified by a configurable parameter. In one example, the artificial neural network module identifies the image data as depicting a portion of a particular spatial region where the artificial neural network classifies the image data as a member of the particular spatial region with a confidence level that exceeds the threshold value. In act 708, the position locating module stores an association between the identified spatial region and the sensor data for subsequent processing.

In examples where location resolution accurate to the spatial region is sufficient, the position locating module terminates the position locating process 700 after the act 708. In examples where location resolution accurate to the spatial region is not sufficient, the position locating module executes to the act 710.

In the act 710, the position locating module identifies a keyframe group associated with the identified spatial region in the map data. Next, the position locating module searches the keyframes associated with the keyframe group for one or more keyframes or that match the image data from the captured frame.

In one example, the position locating module performs this search by calculating a distance metric (e.g., cosine similarity) between each of the keyframes associated with the keyframe group and the image data from the captured frame. The value of this distance metric may be a function of the keypoints included in keyframes associated with the keyframe group and the image data from the captured frame. In this example, the position locating module identifies a keyframe that matches the image data by identifying a keyframe that yields the smallest distance metric when compared to the image data, provided that the smallest distance metric is less than a threshold value. This threshold value may specified by a configurable parameter. Next, the position locating module identifies a camera pose associated with the matching keyframe.

In act 712, the position locating module determines whether a match for the image data was identified in the act 710. If so, the position locating module executes act 714. Otherwise, the position locating module terminates the position locating process 700.

In act 714, the position locating module stores an association between the identified camera pose identified in the act 710 and the sensor data for subsequent processing and terminates the position locating process 700.

Processes in accord with the position locating process 700 enable common, low cost sensors to be used to efficiently and effectively locate and re-locate sensors within a mapped environment. These and other advantages of examples disclosed herein are illustrated by FIG. 8 and its associated description.

Figure 8:
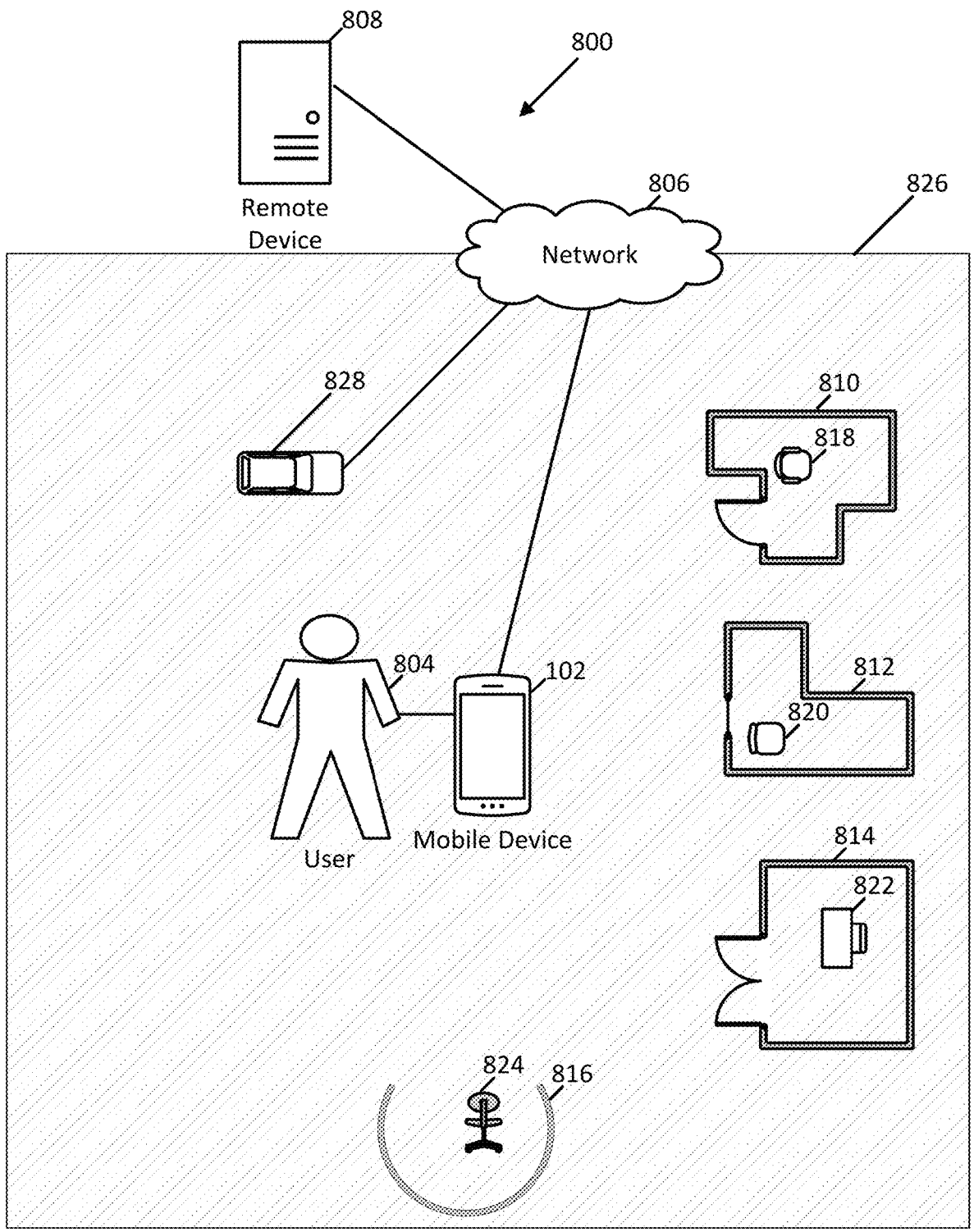
FIG. 8 illustrates a SLAM system within the context of an office environment in accordance with an embodiment of the present disclosure.

FIG. 8 illustrates one example of a SLAM system 800 within the context of environment 826. As shown in FIG. 8, the SLAM system 800 includes the programmable mobile device 102, a self-propelled cleaning device 828, a communication network 806, and a remote device 808. The environment 826 includes a user 804, four rooms 810, 812, 814, and 816. The room 810 includes a chair 818. The room 812 includes a chair 820. The room 814 includes a desk and chair 822. The room 816 includes a chair 824.

The remote device 808 may include any programmable device, such as any of the systems described below with reference to FIGS. 9 and 10. The cleaning device 828 may include a programmable device, such as may be fabricated using any of the components of the systems described below with reference to FIGS. 9 and 10. The communication network 806 may include any communication network through which systems may exchange information. For example, the network 806 may be a public network, such as the Internet, and may include other public or private networks such as LANs, WANs, extranets and intranets. As shown in FIG. 8, the mobile device 102, the cleaning device 828, and the remote device 808 are connected to and communicate data via the network 806.

In one example, the map builder 104, the position locator 106, the map data store 108, and the artificial neural network module 110 are implemented by the remote device 808. In another example, these components are implemented by the mobile device 102 or the cleaning device 828. In other examples, the components are distributed between the remote device 808, the cleaning device 828, and the mobile device 102 as required to meet constraints of a particular installation or to take advantage of installation characteristics, such as the homogeneity of the environments in which the SLAM system 800 is deployed. For example, where the SLAM system 800 is deployed to multiple, visually homogeneous environments, it may be beneficial for the remote device 808 to implement the map builder 104, the map data store 108, and the artificial neural network module 110. In this example, it may also be beneficial to implement the position locator 106 on the mobile device 102 or the cleaning device 828. In this way, multiple environments may be serviced by a single artificial neural network.

A particular usage scenario will now be described with reference to FIG. 8. With the SLAM system 800 executing in a mapping mode, the user 804 may move the mobile device 102 in the environment 826 from room to room. As the user 804 enters and exits each room, the user may indicate entry and exit by interacting with the mobile device 102. During this activity, the map builder acquires sensor data and provides the sensor data to a map builder, such as the map builder 104. The map builder calculates camera poses and builds a map that include features of the rooms, such as wall layout, door location, and contents of each. For example, the map data may include respective keyframe groups for each of rooms 810, 812, 814, and 816. These keyframe groups may include keyframes. These keyframes may be associated with camera poses that include images with keypoints that depict chairs 818, 820, 824, and desk and chair 822.

Continuing with this usage scenario, the artificial neural network module uses the map to execute a transfer learning process on a pre-existing artificial neural network module. In this way, the artificial neural network module adapts the pre-existing artificial neural network to the map data included in the map.

Next, with the SLAM system 800 executing in a localization mode, the cleaning device 828 travels the environment 826 to, for example, clean the floor. During its travels, the cleaning device 828 becomes disoriented after, for example, a worker in the environment moves the cleaning device 828 from the room 816 to the room 814 after the cleaning device 828 has cleaned the room 814. Upon detecting that it is no longer in room 816, the cleaning device 828 executes a re-localization process in which the cleaning device 828 provides new sensor data to a position locator, such as the position locator 106. The position locator interoperates with the artificial neural network module to determine that the cleaning device is now located in room 814 and provides the new location to the cleaning device 828. In response, the cleaning device travels back to room 816 and upon entry, executes several re-localization processes to find the exact location where the cleaning device 828 last cleaned the floor and finishes cleaning the room 816. These re-localization processes reference camera poses associated with the keyframes included in the keyframe group associated with the room 816.

In some examples, the components disclosed herein (e.g., the mobile device 102, the map builder 104, the position locator 106, the artificial neural network module 110, the cleaning device 828, and the remote device 808) may read parameters that affect the operations performed by the components. These parameters may be physically stored in any form of suitable memory including volatile memory (such as RAM) or nonvolatile memory (such as a magnetic hard drive). In addition, the parameters may be logically stored in a proprietary data structure (such as a database or file defined by a user mode application) or in a commonly shared data structure (such as an application registry that is defined by an operating system). Further, some examples provide for both system and user interfaces that allow external entities to modify the parameters and thereby configure the behavior of the components.

Information within the SLAM system 100 may be stored in any logical and physical construction capable of holding information on a computer readable medium including, among other structures, linked lists, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Information may flow between the components disclosed herein using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Example System

Figure 9:
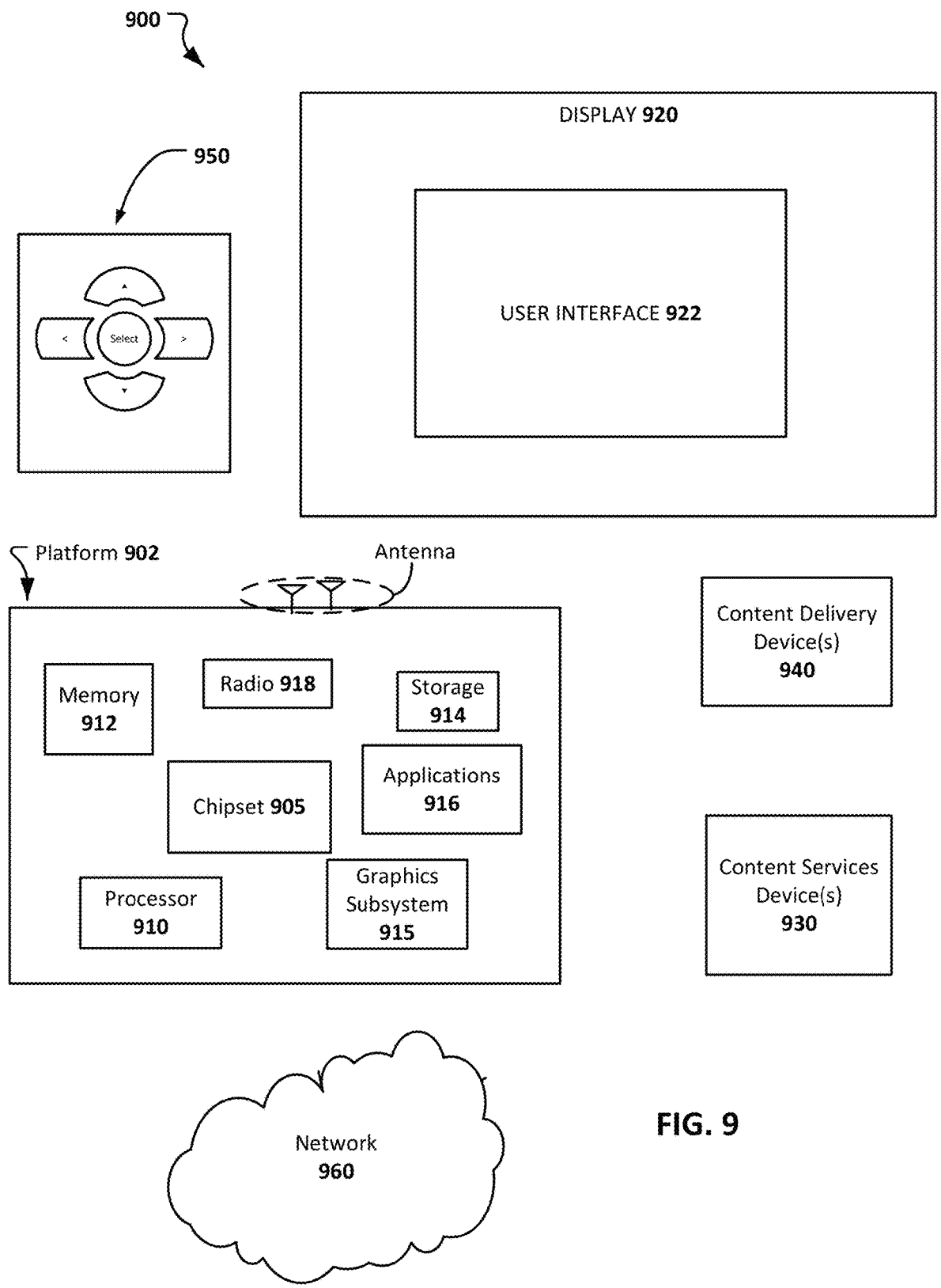
FIG. 9 illustrates a media system configured in accordance with an embodiment of the present disclosure.

FIG. 9 illustrates a computer system 900 configured in accordance with an embodiment of the present disclosure. In some embodiments, system 900 may be a SLAM system for simultaneously localizing and navigating an environment although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 900 comprises a platform 902 coupled to a display 920. Platform 902 may receive content from a content device such as content services device(s) 930 or content delivery device(s) 940 or other similar content sources. A navigation controller 950 comprising one or more navigation features may be used to interact with, for example, platform 902 and/or display 920, so as to supplement navigational gesturing by the user. Each of these example components is described in more detail below.

In some embodiments, platform 902 may comprise any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 910 may comprise dual-core processor(s), dual-core mobile processor(s), and so forth. Memory 912 may be implemented, for instance, as a volatile memory device such as, but not limited to, a Random Access Memory (RAM), Dynamic Random Access Memory (DRAM), or Static RAM (SRAM). Storage 914 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 914 may comprise technology to increase the storage performance enhanced protection for valuable digital media when multiple hard drives are included, for example.

Graphics subsystem 915 may perform processing of images such as still or video for display, and in some embodiments is configured to drive the array of light sources of a direct view display, as variously described herein. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 could be integrated into processor 910 or chipset 905. Graphics subsystem 915 could be a stand-alone card communicatively coupled to chipset 905. The graphics and/or video processing techniques, including direct view projection techniques described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 918 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In some embodiments, display 920 may comprise any television or computer type monitor or display. Under the control of one or more software applications 916, platform 902 may display a user interface 922 on display 920.

In some embodiments, content services device(s) 930 may be hosted by any national, international and/or independent service and thus accessible to platform 902 via the Internet or other network, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920. In some embodiments, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, graphics, text, medical and gaming content, and so forth.

Content services device(s) 930 receives content such as cable television programming including media information, digital information, and/or other content. Examples of content providers may include any cable or satellite television or radio or Internet content providers. The provided examples are not meant to limit the present disclosure. In some embodiments, platform 902 may receive control signals from navigation controller 950 having one or more navigation features. The navigation features of controller 950 may be used to interact with user interface 922, for example. In some embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In some embodiments, controller 950 may not be a separate component but integrated into platform 902 and/or display 920. Embodiments, however, are not limited to the elements or in the context shown or described herein, as will be appreciated.

In some embodiments, drivers (not shown) may comprise technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 when the platform is turned "off." In addition, chipset 905 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 9.

As described above, system 900 may be embodied in varying physical styles or form factors. FIG. 10 illustrates embodiments of a small form factor device 1000 in which system 900 may be embodied. In some embodiments, for example, device 1000 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 10:
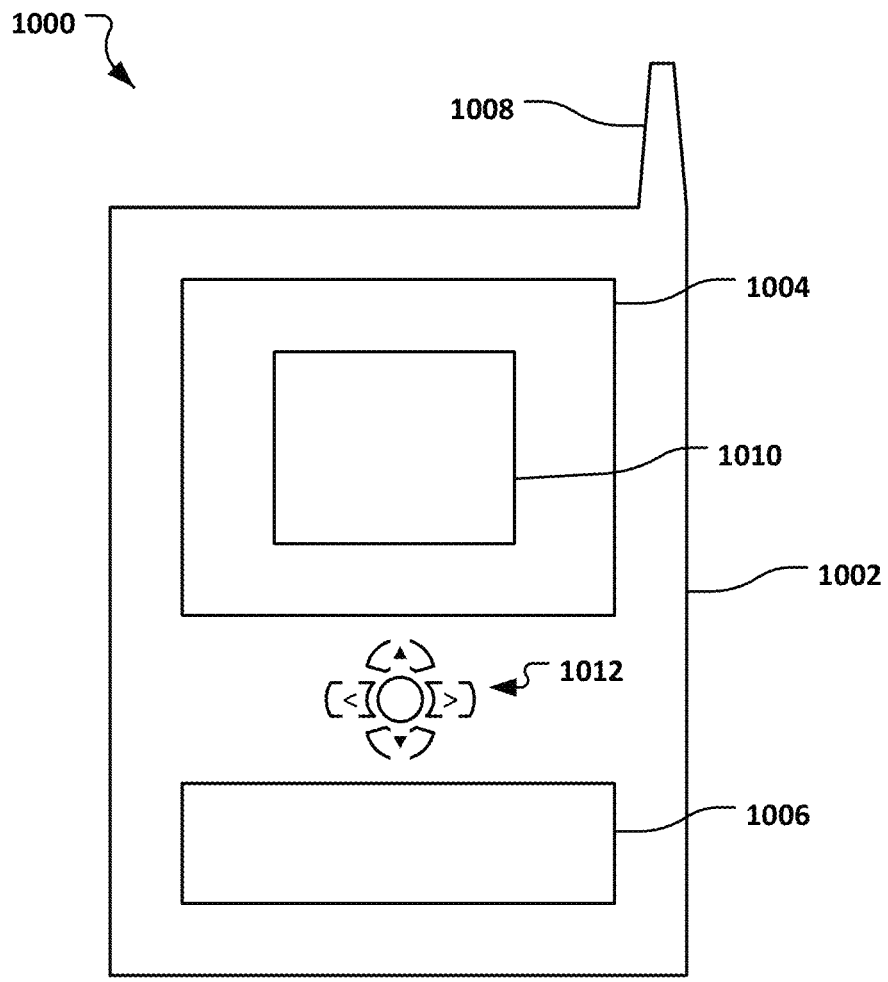
FIG. 10 illustrates a mobile computing system configured in accordance with an embodiment of the present disclosure.

As shown in FIG. 10, device 1000 may comprise a housing 1002, a display 1004, an input/output (I/O) device 1006, and an antenna 1008. Device 1000 also may comprise navigation features 1012. Display 1004 may comprise any suitable display unit for displaying information appropriate for a mobile computing device, which in one example embodiment is a pixelated display capable of direct view as provided herein. I/O device 1006 may comprise any suitable I/O device for entering information into a mobile computing device. Examples for I/O device 1006 may include an alphanumeric keyboard, a numeric keypad, a touch pad, input keys, buttons, a camera, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a non-transitory machine-readable medium or article or computer program product which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is a simultaneous localization and mapping (SLAM) system including: a memory; at least one processor coupled to the memory; an artificial neural network module executable by the at least one processor and configured to implement an artificial neural network including a classification layer; a map building module executable by the at least one processor and configured to: receive sensor data descriptive of a plurality of spatial regions, the sensor data including image data; and train a new classification layer of the artificial neural network using the image data; and a position locating module executable by the at least one processor and configured to: provide new sensor data descriptive of a spatial region of the plurality of spatial regions to the artificial neural network module; and receive information identifying the spatial region from the artificial neural network module.

Example 2 includes the subject matter of Example 1, wherein the artificial neural network module is configured to implement a convolutional artificial neural network.

Example 3 includes the subject matter of any of the preceding Examples, wherein the map building module is further configured to discard the classification layer prior to training the new classification layer.

Example 4 includes the subject matter of any of the preceding Examples, wherein the sensor data includes at least one of three-dimensional image data, two-dimensional image data, and inertial measurement data.

Example 5 includes the subject matter of any of the preceding Examples, wherein the information identifying the spatial region includes a list of spatial region identifiers and associated confidence levels.

Example 6 includes the subject matter of any of the preceding Examples, wherein the map building module is further configured to generate map data from the sensor data, the map data including one or more associations that associate the image data with one or more spatial regions of the plurality of spatial regions.

Example 7 includes the subject matter of Example 6, wherein the image data includes keyframes comprising keypoints.

Example 8 include the subject matter of Example 7, wherein the position locating module is further configured to: identify one or more keyframes associated with the spatial region, the one or more keyframes including one or more keypoints; determine whether the new sensor data describes the one or more keypoints; and identify one or more camera poses associated with the one or more keypoints in response to determining that the new sensor data describes the one or more keypoints.

Example 9 includes the subject matter of any of Examples 6 through 8, wherein the map building module is further configured to: receive a message indicating that the one or more sensors are located in one spatial region of the plurality of spatial regions; and generate an association of the one or more associations based on sensor data received after the message.

Example 10 includes the subject matter of Example 9, wherein the position locating module is further configured to: receive a message requesting re-localization of the one or more sensors; and provide the new image data to the artificial neural network module in response to receiving the message.

Example 11 is a method of mapping and localizing within an environment using an artificial neural network module implementing an artificial neural network including a classification layer, the method comprising: receiving sensor data descriptive of a plurality of spatial regions, the sensor data including image data; training a new classification layer of the artificial neural network using the image data; providing new image data descriptive of a spatial region of the plurality of spatial regions to the artificial neural network module; and receiving information identifying the spatial region from the artificial neural network module.

Example 12 includes the subject matter of Example 11, wherein the artificial neural network module implements a convolutional artificial neural network and training the new classification layer includes training a new classification layer of the convolutional artificial neural network.

Example 13 includes the subject matter of Example 11 or 12, further comprising discarding the classification layer prior to training the new classification layer.

Example 14 includes the subject matter of any of Examples 11 through 13, wherein receiving the sensor data includes receiving at least one of three-dimensional image data, two-dimensional image data, and inertial measurement data.

Example 15 includes the subject matter of any of Examples 11 through 14, wherein receiving the information identifying the spatial region includes receiving a list of spatial region identifiers and associated confidence levels.

Example 16 includes the subject matter of any of Examples 11 through 15, further comprising generating map data from the sensor data, the map data associating the image data with one or more spatial regions of the plurality of spatial regions.

Example 17 includes the subject matter of Example 16, wherein generating the map data includes associating keyframes comprising keypoints with the one or more spatial regions.

Example 18 includes the subject matter of Example 17, further comprising: identifying one or more keyframes associated with the spatial region, the one or more keyframes including one or more keypoints; determining whether the new image data describes the one or more keypoints; and identifying one or more camera poses associated with the one or more keypoints in response to determining that the new image data describes the one or more keypoints.

Example 19 includes the subject matter of any of Examples 16 through 18, further comprising: receiving a message indicating that one or more sensors are located in one spatial region of the plurality of spatial regions; receiving additional sensor data from the one or more sensors after receiving the message; and associating the additional sensor data with the one spatial region.

Example 20 includes the subject matter of Example 19, further comprising: receiving a message requesting re-localization of the one or more sensors; and providing the new image data to the artificial neural network module in response to receiving the message.

Example 21 is a non-transitory computer program product encoded with instructions that when executed by one or more processors cause a process for mapping and localizing within an environment using an artificial neural network module to be carried out, the process comprising: receiving sensor data descriptive of a plurality of spatial regions, the sensor data including image data; training a new classification layer of the artificial neural network using the image data; providing new image data descriptive of a spatial region of the plurality of spatial regions to the artificial neural network module; and receiving information identifying the spatial region from the artificial neural network module.

Example 22 includes the subject matter of Example 21, wherein the artificial neural network module implements a convolutional artificial neural network and training the new classification layer includes training a new classification layer of the convolutional artificial neural network.

Example 23 includes the subject matter of Example 21 or 22, the process further comprising discarding the classification layer prior to training the new classification layer.

Example 24 includes the subject matter of any of Examples 21 through 23, wherein receiving the sensor data includes receiving at least one of three-dimensional image data, two-dimensional image data, and inertial measurement data.

Example 25 includes the subject matter of any of Examples 21 through 24, wherein receiving the information identifying the spatial region includes receiving a list of spatial region identifiers and associated confidence levels.

Example 26 includes the subject matter of any of Examples 21 through 25, the process further comprising generating map data from the sensor data, the map data associating the image data with one or more spatial regions of the plurality of spatial regions.

Example 27 includes the subject matter of Example 26, wherein generating the map data includes associating keyframes comprising keypoints with the one or more spatial regions.

Example 28 includes the subject matter of Example 27, the process further comprising: identifying one or more keyframes associated with the spatial region, the one or more keyframes including one or more keypoints; determining whether the new image data describes the one or more keypoints; and identifying one or more camera poses associated with the one or more keypoints in response to determining that the new image data describes the one or more keypoints.

Example 29 includes the subject matter of any of Examples 26-28, the process further comprising: receiving a message indicating that one or more sensors are located in one spatial region of the plurality of spatial regions; receiving additional sensor data from the one or more sensors after receiving the message; and associating the additional sensor data with the one spatial region.

Example 30 includes the subject matter of Example 29, the process further comprising: receiving a message requesting re-localization of the one or more sensors; and providing the new image data to the artificial neural network module in response to receiving the message.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A simultaneous localization and mapping (SLAM) system comprising:
   a memory; and
   at least one processor coupled to the memory and configured to:
      receive sensor data descriptive of a plurality of spatial regions, the sensor data including image data;
      train, using the image data, an artificial neural network to identify spatial regions of the plurality of spatial regions;
      provide, to the artificial neural network, new sensor data descriptive of a spatial region of the plurality of spatial regions;
      receive, from the artificial neural network, information identifying the spatial region of the plurality of spatial regions;
      identify one or more keyframes associated with the spatial region; and
      identify at least one camera pose using the one or more keyframes associated with the spatial region.

2. The SLAM system of claim 1, wherein the sensor data includes one or more of three-dimensional image data, two-dimensional image data, and inertial measurement data.

3. The SLAM system of claim 1, wherein the information identifying the spatial region of the plurality of spatial regions includes a list of spatial region identifiers and associated confidence levels.

4. The SLAM system of claim 1, wherein the at least one processor is further configured to generate map data from the sensor data, the map data including one or more associations that associate the image data with one or more spatial regions of the plurality of spatial regions.

5. The SLAM system of claim 4, wherein the image data includes the one or more keyframes, each of the one or more keyframes includes one or more keypoints, and the at least one processor is further configured to:
   determine whether the new sensor data describes the one or more keypoints; and
   identify the at least one camera pose by identifying one or more camera poses associated with the one or more keypoints in response to determining that the new sensor data describes the one or more keypoints.

6. The SLAM system of claim 4, further comprising one or more sensors, wherein the at least one processor is further configured to:
   receive a first message indicating that the one or more sensors are located in one spatial region of the plurality of spatial regions; and
   generate an association of the one or more associations based on sensor data received after the first message.

7. The SLAM system of claim 6, wherein the at least one processor is further configured to:
   receive a second message requesting re-localization of the one or more sensors; and
   provide the new sensor data to the artificial neural network in response to receiving the second message.

8. A method of mapping and localizing within an environment using a computing device, the method comprising:
   receiving sensor data descriptive of a plurality of spatial regions, the sensor data including image data;
   training, using the image data, an artificial neural network to identify spatial regions of the plurality of spatial regions;
   providing new sensor data descriptive of a spatial region of the plurality of spatial regions to the artificial neural network;
   receiving, from the artificial neural network, information identifying the spatial region of the plurality of spatial regions;
   identifying one or more keyframes associated with the spatial region; and
   identifying at least one camera pose using the one or more keyframes associated with the spatial region.

9. The method of claim 8, wherein receiving the sensor data includes receiving one or more of three-dimensional image data, two-dimensional image data, and inertial measurement data.

10. The method of claim 8, wherein receiving the information identifying the spatial region of the plurality of spatial regions includes receiving a list of spatial region identifiers and associated confidence levels.

11. The method of claim 8, further comprising generating map data from the sensor data, the map data associating the sensor data with one or more spatial regions of the plurality of spatial regions and associating keyframes comprising keypoints with the one or more spatial regions.

12. The method of claim 11, wherein the image data includes the one or more keyframes, each of the one or more keyframes includes one or more keypoints, and the method further comprises:
   determining whether the new sensor data describes the one or more keypoints; and
   identifying the at least one camera pose by identifying one or more camera poses associated with the one or more keypoints in response to determining that the new sensor data describes the one or more keypoints.

13. The method of claim 11, further comprising:
   receiving a first message indicating that one or more sensors are located in one spatial region of the plurality of spatial regions; and
   generating an association between sensor data received after the first message and the one spatial region.

14. The method of claim 13, further comprising:
   receiving a second message requesting re-localization of the one or more sensors; and
   providing the new sensor data to the artificial neural network in response to receiving the second message.

15. A non-transitory computer program product encoded with instructions that when executed by one or more processors cause a process for mapping and localizing within an environment using an artificial neural network to be carried out, the process comprising:
   receiving sensor data descriptive of a plurality of spatial regions, the sensor data including image data;

training, using the image data, the artificial neural network to identify spatial regions of the plurality of spatial regions;
providing new sensor data descriptive of a spatial region of the plurality of spatial regions to the artificial neural network;
receiving information identifying the spatial region of the plurality of spatial regions from the artificial neural network;
identifying one or more keyframes associated with the spatial region; and
identifying at least one camera pose using the one or more keyframes associated with the spatial region.

16. The computer program product of claim 15, wherein receiving the sensor data includes receiving one or more of three-dimensional image data, two-dimensional image data, and inertial measurement data.

17. The computer program product of claim 15, wherein receiving the information identifying the spatial region of the plurality of spatial regions includes receiving a list of spatial region identifiers and associated confidence levels.

18. The computer program product of claim 15, the process further comprising generating map data from the sensor data, the map data associating the sensor data with one or more spatial regions of the plurality of spatial regions.

19. The computer program product of claim 18, wherein the image data includes the one or more keyframes, each of the one or more keyframes includes one or more keypoints, and the process further comprises:
determining whether the new sensor data describes the one or more keypoints; and
identifying the at least one camera pose by identifying one or more camera poses associated with the one or more keypoints in response to determining that the new sensor data describes the one or more keypoints.

20. The computer program product of claim 18, the process further comprising:
receiving a first message indicating that one or more sensors are located in one spatial region of the plurality of spatial regions; and
generating an association between sensor data received after the first message and the one spatial region.

21. The computer program product of claim 20, the process further comprising:
receiving a second message requesting re-localization of the one or more sensors; and
providing the new sensor data to the artificial neural network in response to receiving the second message.

* * * * *